(12) United States Patent
Sheu et al.

(10) Patent No.: US 7,009,331 B2
(45) Date of Patent: Mar. 7, 2006

(54) CARBON NANO-TUBE FIELD EMISSION DISPLAY HAVING STRIP SHAPED GATE

(75) Inventors: Jyh-Rong Sheu, Hsinchu (TW); Chun-Tao Lee, Hsinchu (TW); Shin-Chiuan Jiang, Hsinchu (TW); Yu-Yang Chang, Hsinchu (TW); Cheng-Chung Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/724,741

(22) Filed: Dec. 2, 2003

(65) Prior Publication Data

US 2005/0067938 A1 Mar. 31, 2005

(30) Foreign Application Priority Data

Sep. 30, 2003 (TW) .............................. 92127090 A

(51) Int. Cl.
*H01J 1/02* (2006.01)
*H01J 19/24* (2006.01)

(52) U.S. Cl. ..................... 313/309; 313/336; 313/351; 313/497; 313/311

(58) Field of Classification Search ........ 313/495–497, 313/309–311, 336, 351
See application file for complete search history.

(56) References Cited

U.S. PATENT DOCUMENTS

| 6,380,671 | B1 * | 4/2002 | Lee ............................. 313/495 |
| 6,515,639 | B1 * | 2/2003 | Martinez ..................... 345/11 |
| 6,617,798 | B1 * | 9/2003 | Lee et al. ................ 315/169.3 |
| 2004/0256976 | A1 * | 12/2004 | Van Der Vaart et al. .... 313/495 |

* cited by examiner

*Primary Examiner*—Ashok Patel

(57) ABSTRACT

A carbon nano-tube field emission display has a plurality of strip shaped gates, wherein the strip shaped gate of the triode structure is in place of the conventional hole shaped gate, and moreover, a plurality of cathode electrons are induced by the electric force from the side of the gate. Therefore, when the carbon nano-tube electron emission source emits electrons, which are controlled under the strip shaped gate, the diffusion direction of the electron beam is confined in the same direction. Consequently, controlling the image pixel and using the particular advantage of the triode-structure field emission display significantly improve the image uniformity and the luminous efficiency.

2 Claims, 10 Drawing Sheets

CARBON NANO-TUBE FIELD EMISSION DISPLAY HAVING STRIP SHAPED GATE

FIELD OF THE INVENTION

The present invention relates to a carbon nano-tube field emission display having strip shaped gate, and more particularly to using the strip shaped gate and the electric force from the side of the gate to confine the diffusion direction of the electron beam in the same direction, and achieve high luminous efficiency.

BACKGROUND OF THE INVENTION

A carbon nano-tube field emission display (CNT-FED) uses screen-printing processes and field emission display technology to achieve the capability of flat display panel from the conventional field emission display. It not only reserves the image quality of cathode-ray tube display but also provides the advantage of saving energy and small volume. Moreover, the above advantages combine with the low conductive electric field, the high emission current density and high stability of the carbon nano-tube simultaneously, so the CNT-FED can be a novel flat display with the advantages of low driving voltage, high luminous efficiency, no view angle problem, low energy consuming, large size and reduced cost.

Referring to FIG. 1, which shows the schematic view of a conventional field emission display wit a triode structure, the triode structure is a common structure for improving the electron energy, the luminous efficiency and reducing the control voltage. The luminous principle of a conventional carbon nano-tube field emission display is shown in FIG. 1, the conventional CNT-FED includes a substrate 101 and a cathode electrode 102 formed on the substrate 101; a carbon nano-tube layer formed on the surface of the cathode electrode 102 as an electron emitter 103; a dielectric layer 104 formed adjacent to the cathode electrode and a gate 105; wherein a plurality of electrons arc induced from the cathode electrode 102 by the gate 105, and the direction of the electron current is shown as the direction of the arrowhead in FIG. 1. After that, an anode plate 107 is provided on the opposite side of the cathode electrode 102, and a phosphor layer 106 formed on one side of the anode plate 107 is bombarded by the electron beam, and red, green and blue colors are emitting through the glass substrate 108 to outside.

Referring to FIG. 1, wherein the anode plate 107 of the triode structure is provided to improve the energy of the electrons; the cathode electrode 102 is the electron emitter, the gate 105 is provided to attract the electrons. In conventional triode structure, the shapes of most of the gates 105 are hole shaped, and the carbon nano-tube emitter 103 is in the hole of the hole shaped gate 105. The advantage of the hole shaped gate 105 is the electron beam easy control, but the drawback is the electron beam easy diffusing to all-directions. In order to narrow the diffusion of the electrons, the hole shaped gate 105 needs to be made very small, extremely smaller than 10 μm.

Referring to FIG. 2, which is a plan schematic view showing a first hole shaped gate structure of a conventional carbon nano-rube field emission display (Korea Samsung), the triode carbon nano-tube structure is formed on a substrate 101 and the electrons of the carbon nano-tube emitters 103 formed on the cathode in the gate holes 22 are induced by the gates 105, and then they are accelerated by the anode plate 107 to bombard the phosphor 106 fanned on the anode plate (not shown in the figure) and this structure illustrated above is a conventional Spindt type structure. Because the electrons of the carbon nano-tube emitters 103 induced by the gate holes 22 diffuse to all-directions, it produces the cross-talk phenomenon.

Referring to FIG. 3A through 3C, a schematic view showing a second hole shaped gate structure of a conventional carbon nano-tube field emission display is illustrated. The carbon nano-tube emitters 103 are provided in the holes of a plurality of gates 105, the plurality of gate holes are isolated with each other by a dielectric layer 104, a plurality 0f cathode electrodes 102 is provided on the substrate 101, and an anode plate 107 is provided opposite to the cathode electrodes 102. The electric field is formed by the cathode electrode 102 and the anode plate 107 and the electrons are induced from the cathode electrode 102, so the electrons of the electron emitters 103 are induced by the gates 105 to bombard the phosphor 106 formed on the anode plate 107.

FIG. 3B is a cross sectional schematic view along the X-direction in FIG. 3A. In the figures, the gate holes formed by the gates 105 and the electron emitters 103 are obvious, and the electrons of the electron emitters 103 are induced from the cathode electrodes 102 by the gates 105 to bombard the phosphor 106 formed on the anode plate 107. Although the hole shaped gates 105 can control the electron beam, the electron beam easily diffuses to all-directions after leaving the gate holes (as the arrowheads show). As FIG. 3C shows a cross sectional schematic view along the Y-direction in FIG. 3A, the direction of the arrowhead is the direction of the electron beam. Although the electron emitters 103 are around by the gates 105, the electrons of the electron emitters 103 induced by the gates 105 still diffuse to all-directions.

There is one other conventional emitter design, which is a wedge-shaped emitter, and the emitting mechanism is the same as the Spindt type structure illustrated above. However, in the same field emission array (FEA), the field emission area for the wedge-shaped emitter is larger than, the conventional Spindt type structure. But the electron beam of the wedge-shaped emitter structure still diffuses to bombard the close pixels on the anode plate, and produces the cross-talk phenomenon in X and Y directions.

Due to the problems of the conventional FED and the difficulty of the screen-printing technology for forming the carbon nano-tube field emission display, a carbon nano-tube field emission display having strip shaped gates is provided according to the present invention. The present invention is using the side electron force of the gates to attract the electrons to control the electron diffusion direction confined in die same direction, and achieves the object of high luminous efficiency

SUMMARY OF THE INVENTION

The present invention has been made in an effort to solve the above problems.

It is therefore an object of the present invention to provide a carbon nano-tube field emission display having strip shaped gate that achieves high luminous efficiency.

To achieve the above object, the present invention provides a carbon nano-tube field emission display comprising: a cathode plate including a substrate and a plurality of cathode electrodes formed on the substrate; a dielectric layer including a plurality of dielectric strips formed on the substrate and the cathode electrodes; an anode plate provided substantially in parallel with and at a distance from the cathode electrodes; and a light-emitting layer consisting of light-emitting materials formed on a surface of the anode plate opposite to the cathode electrodes. The feature of the above-mentioned structure is: a plurality of strip shaped gates and the cathode electrodes perpendicular to one another across the dielectric layer, and a plurality of carbon nano-tube electron emitters provided on the surface of the cathode electrodes at the sides of the strip shaped gazes. In the structure, the strip shaped gale is now in place of the conventional hole shaped gate, and a plurality of cathode electrons are induced by the electric force from the side of the gate. Therefore, when the carbon nano-tube electron emitter emits electrons, which are controlled under the strip shaped gate, the diffusion direction of the electron beam is confined in the same direction. Consequently, the controlling of the image pixel significantly improves the image uniformity and achieves the object of high luminous efficiency.

DETAILED DESCRIPTION OF THE INVENTION

Figure 1:
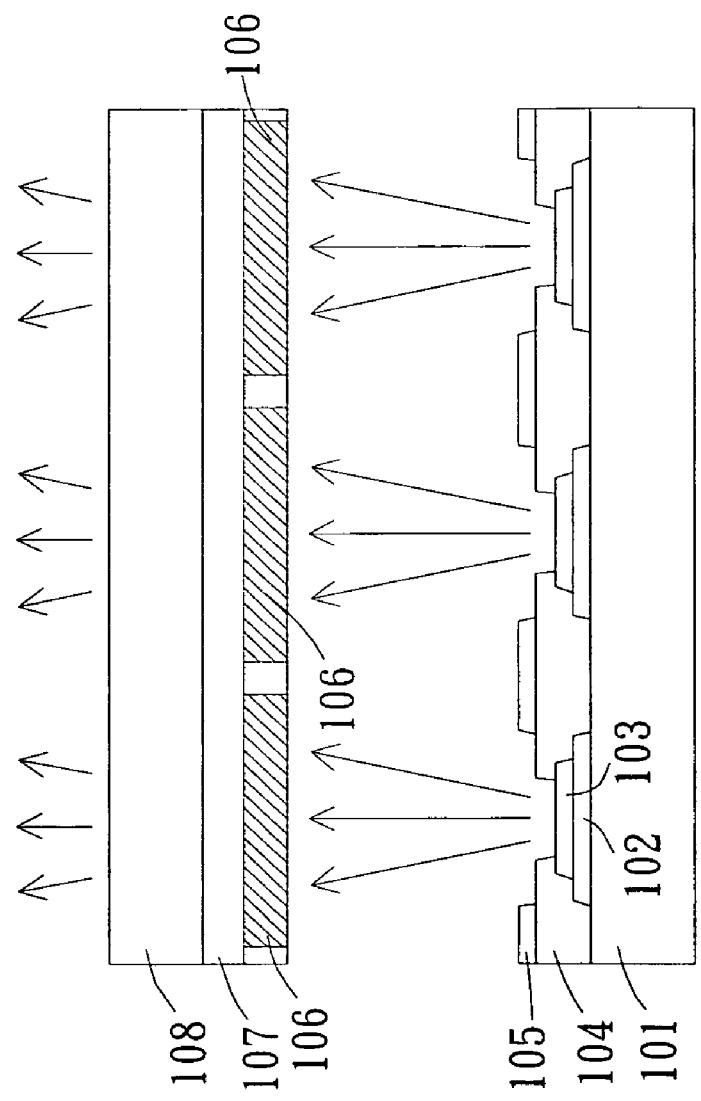
FIG. 1 is a cross sectional schematic view showing a triode structure of a conventional field emission display (FED).
Figure 2:
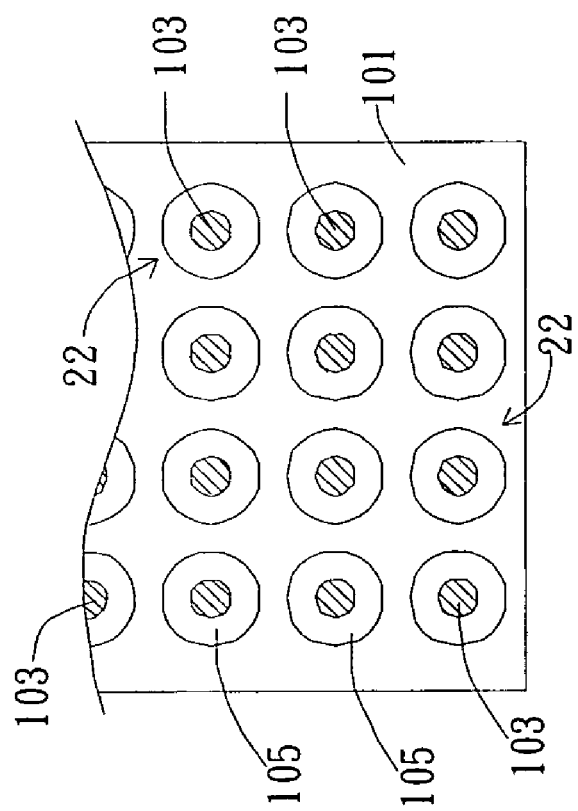
FIG. 2 is a plan schematic view showing a first hole shaped gate structure of a conventional carbon nano-tube field emission display (CNT-FED).
Figure 3A:
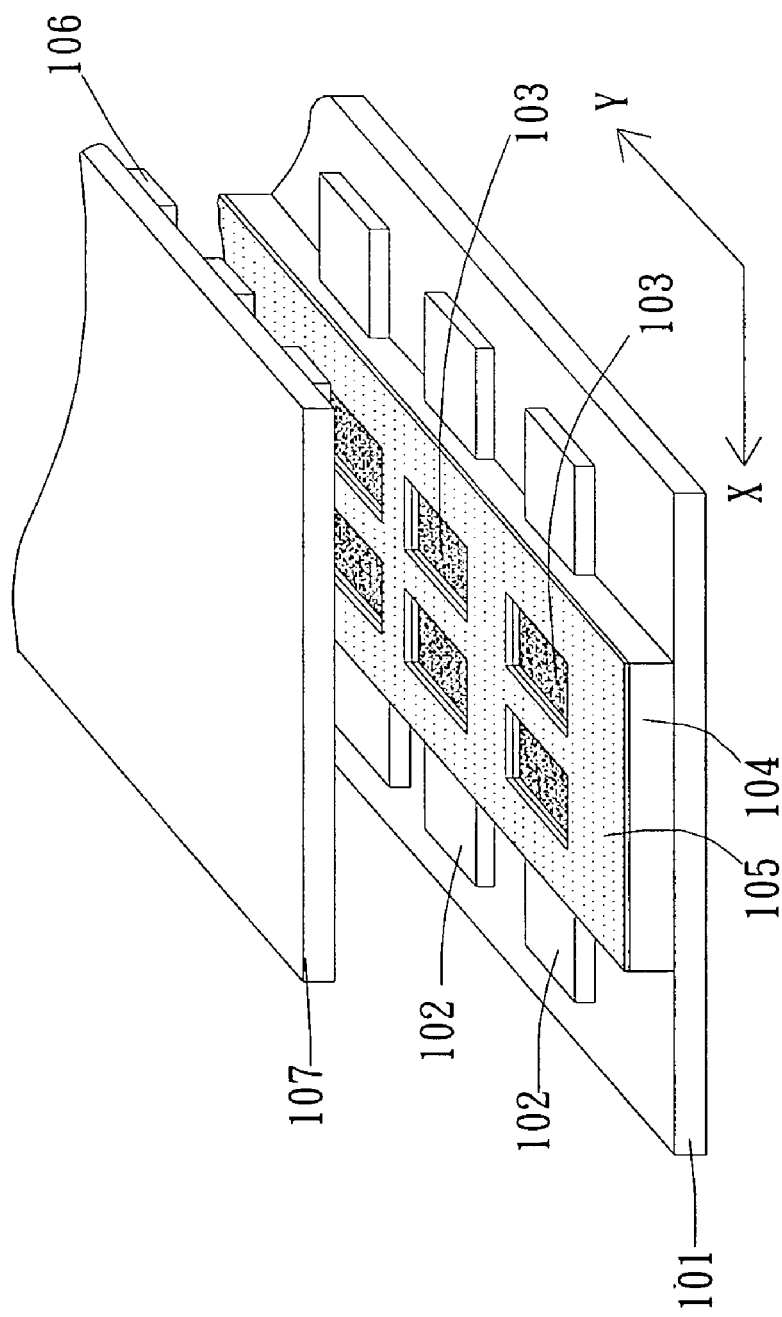
FIG. 3A is a schematic view showing a second hole shaped gate structure of a conventional carbon nano-tube field emission display (CNT-FED).
Figure 3B:
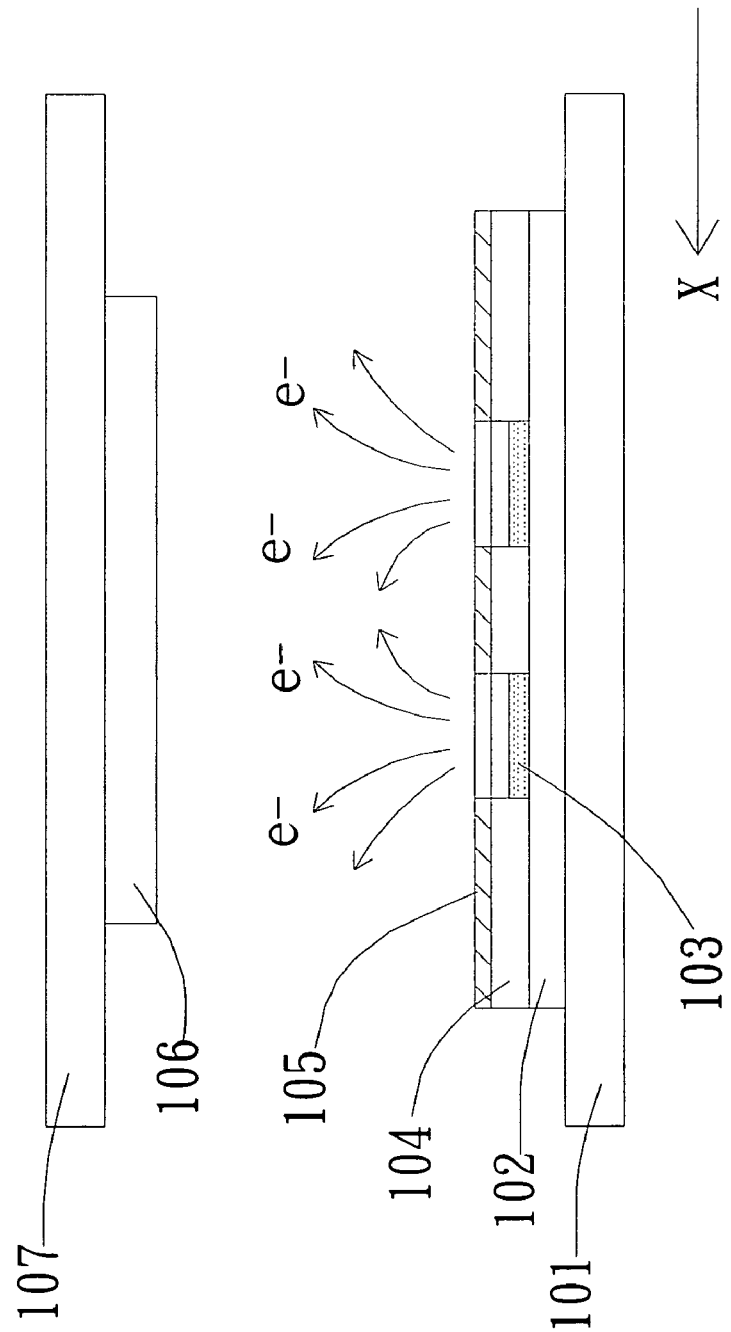
FIG. 3B is a cross sectional schematic view along the X-direction in FIG. 3A.
Figure 3C:
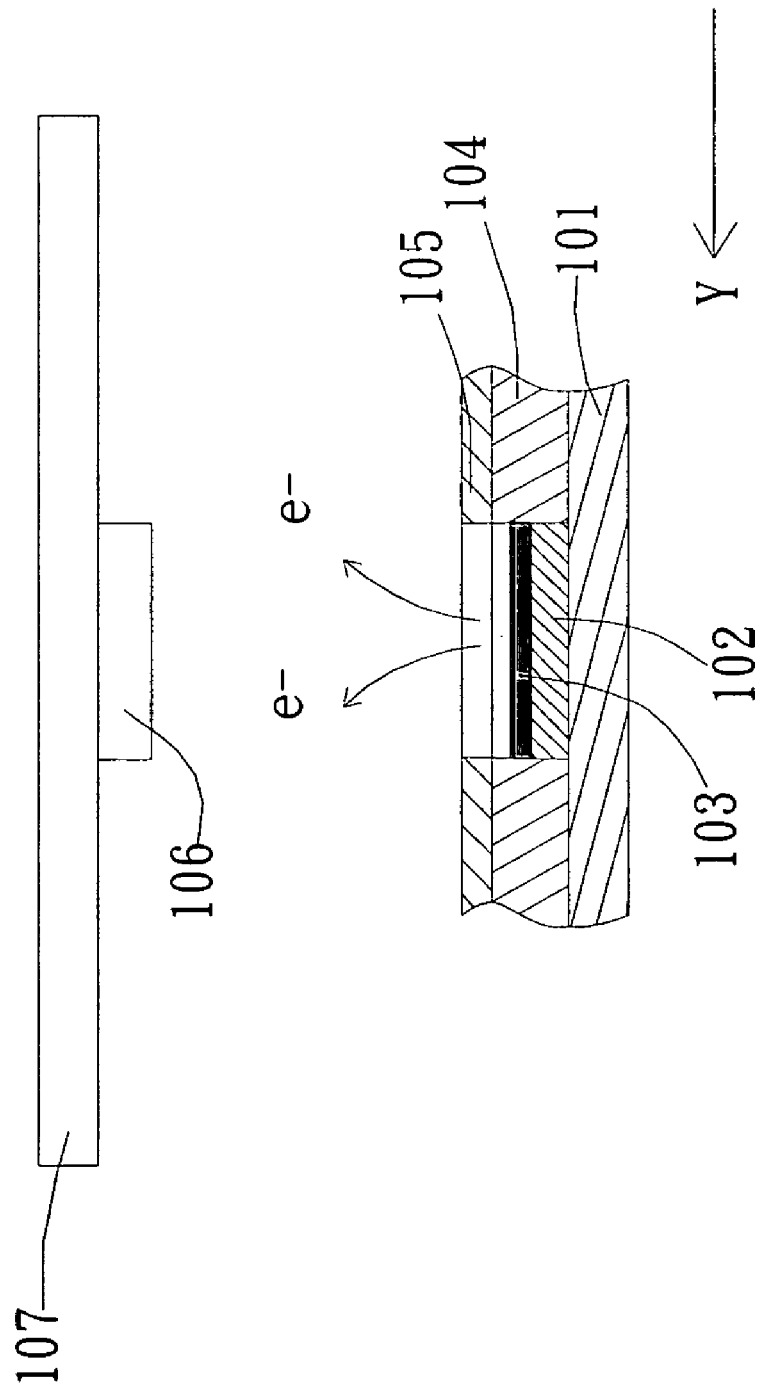
FIG. 3C is a cross sectional schematic view along the Y-direction in FIG. 3A.
Figure 4A:
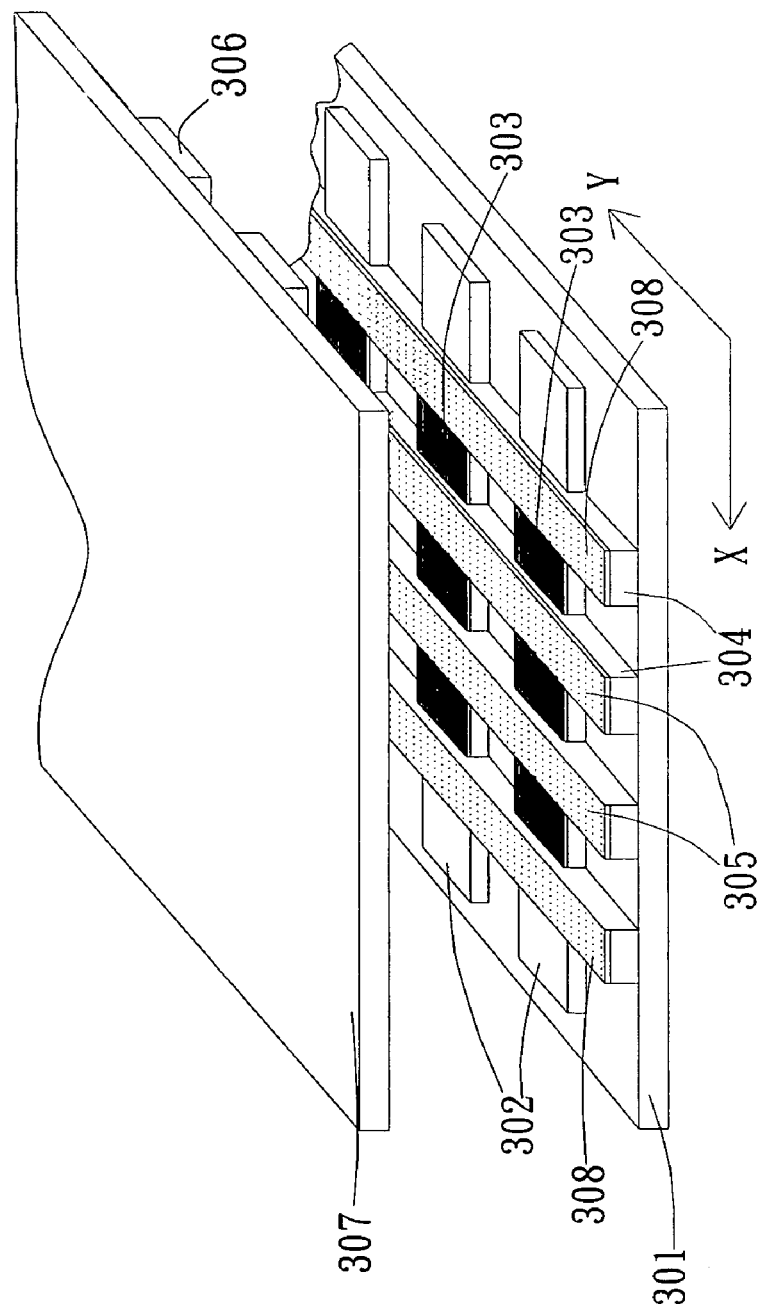
FIG. 4A is a schematic view showing a carbon nano-tube field emission display (CNT-FED) having strip shaped gates according to a first embodiment of the present invention.

FIG. 4A is a schematic view showing a carbon nano-tube field emission display (CNT-FED) having strip shaped gates according to a first embodiment of the present invention that uses the electric force from the side of the gate layer 305 to induce cathode electrons. In the structure according to the present invention, an anode plate 307 is on the upper position, so a plurality of electrons of a cathode electrode 302 is accelerated by the anode plate 307, and ten these electrons bombard a light-emitting layer 306, substantially symmetrical with said cathode electrode 302, formed on the anode plate 307 and made of light-emitting materials (ex. phosphor) to improve the luminous efficiency. In addition, as shown in the drawing, the carbon nano-tube Reid emission display according to the first embodiment of the present invention includes a substrate 301, and a cathode plate consists of a plurality of cathode electrodes 302 formed on the substrate. The cathode electrodes 302 are formed by screen printing a conductive layer or formed by patterning a metal film via photolithography and etching steps. The gate electrodes 305 are the strip shaped gates set along carbon nano-rube emitters 303 and are also formed by screen printing a conductive layer or formed by a metal film via photolithography and etching steps and they are at a distance to the substrate and the cathode electrodes by a dielectric layer 304 provided between the cathode electrodes 302 and the gate electrodes 305. The two gate lines at the outside position of the gate layers 305 can also be control electrodes 308. The carbon nano-tube emitters 303 provided on the cathode electrodes at the sides of the gate electrodes 305 are formed by screen printing technology, phololithography step plus etching step or photolithography step plus development step. Accordingly, the plurality of emitters 303 can't interfere with each other and the carbon nano-tube emitters 303 are made of carbon nano-tube material or any emit-able material to achieve the efficiency of the present invention. In the present invention, art anode plate 307 is provided at a distance from the substrate 301, wherein a light-emitting layer 306 having a plurality of light-emitting strips formed on a surface of the anode plate 307 substantially parallel and symmetrical with the cathode electrodes 302. An accelerated electric field is formed so a plurality of electrons induced from the carbon nano-tube emitters 303 by the gate electrodes 305 bombards the light-emitting layer 306 to show colors.

The main feature of the structure, the carbon nano-tube field emission display having strip shaped gates according to the present invention, is: the direction of the gate electrodes 305 and the cathode electrodes 302 are perpendicular to one another, and moreover, on the basis of the design of the gate shape, the gate can attract the electrons from both sides of the cathode electrode 302 simultaneously or only one side of the cathode electrode 302. The carbon nano-tube emitters 303 is controlled under the strip shaped gate (the direction of the arrowhead in FIG. 4C).

In addition, the high accuracy of the pattern alignment is not necessary for the strip shaped gate according to the present invention. Therefore, the advantage of the structure according to the present invention is that the diffusion direction of the electron beams from the carbon nano-tube emitters 303 is confined in the same direction and it can avoid the phenomenon that die electron beams diffuse in all-directions according to the conventional hole shaped gates. The processes for forming the CNT-FED according to the present invention are easier and the yield is improved, and moreover, the surface emitting area according to the present invention is more than the conventional CNT emitter (hole shaped gates design).

Figure 4B:
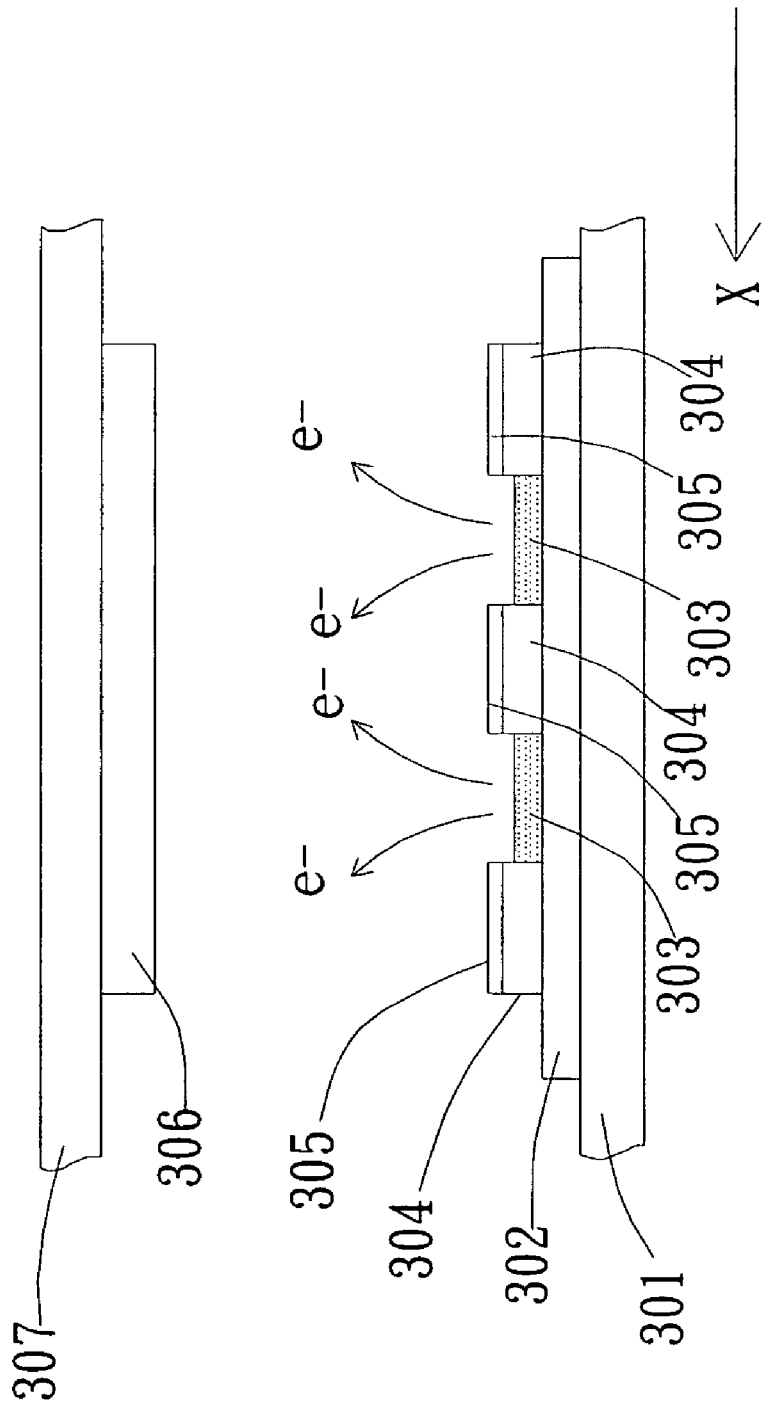
FIG. 4B is a cross sectional schematic view along the X-direction in FIG. 4A.
Figure 4C:
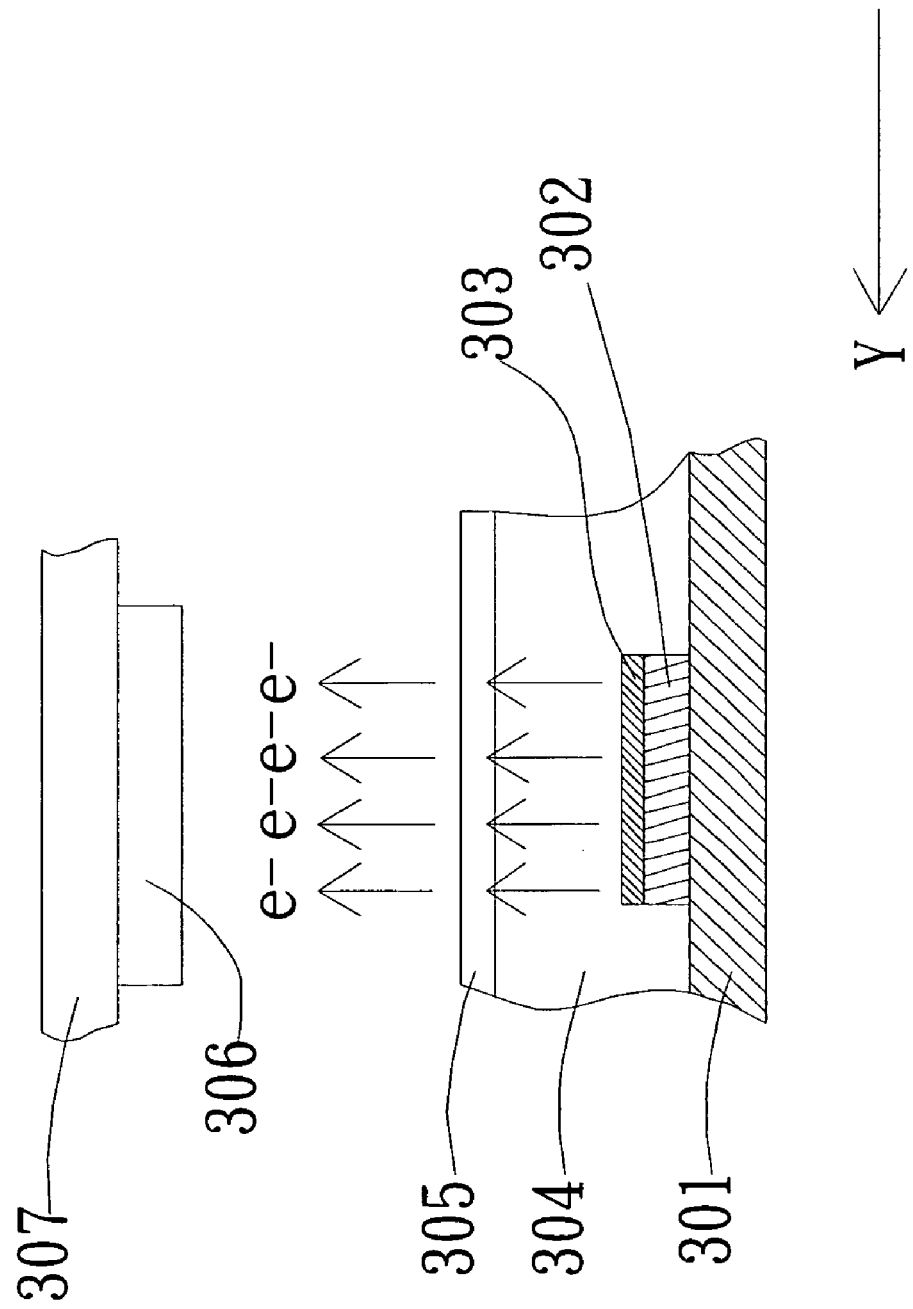
FIG. 4C is a cross sectional schematic view along the Y-direction in FIG. 4A.

FIG. 4B is a cross sectional schematic view along the X-direction in FIG. 4A. Because a hole shaped gate is also formed between the two sides of the carbon nano-tube emitters 303 and the gate electrodes 305, the electrons still diffuse in all-directions as the direction arrowhead shown in the figure, but the problem of interference wouldn't happen between the adjacent emitters 303. On the other hand, referring to the FIG. 4A and FIG. 4C, the cross sectional schematic view along the Y-direction in FIG. 4A, a rectangular shaped recessed area is formed above the substrate 301 on each side of every emitter 303 between two adjacent gate electrodes and there are no gate electrodes 305 at two sides of the carbon nano-tube emitter 303, so the electron beam emitted from the nano-tube emitter 303 wouldn't diffuse by the interference of the gate electrodes 305. The electrons are directly accelerated by the electric field formed between the anode plate 307 and the cathode electrode 302, and then bombard the light-emitting layer 306 to improve the luminous efficiency. Consequently, the emitters 303 can't interfere with each other so the interference problem won't happen.

Figure 5A:
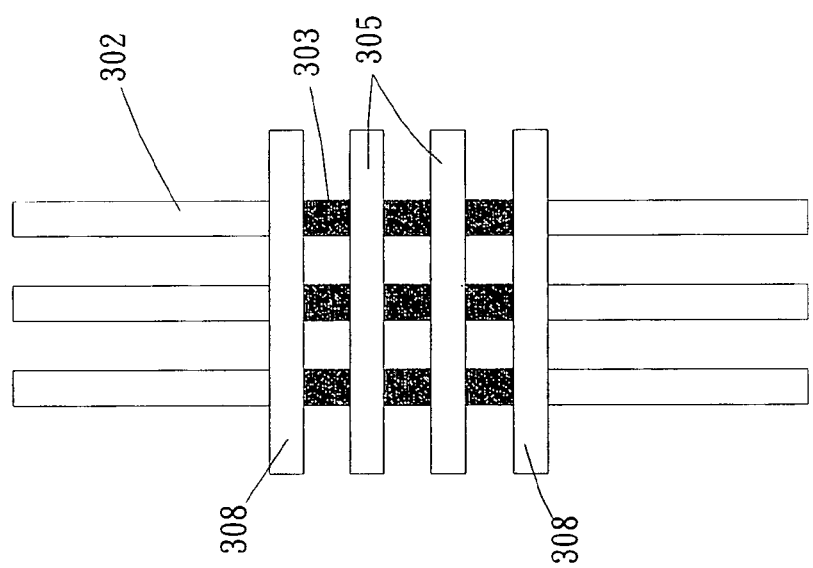
FIG. 5A is a plan schematic view of the FIG. 4A leaving out the anode plate.
Figure 5B:
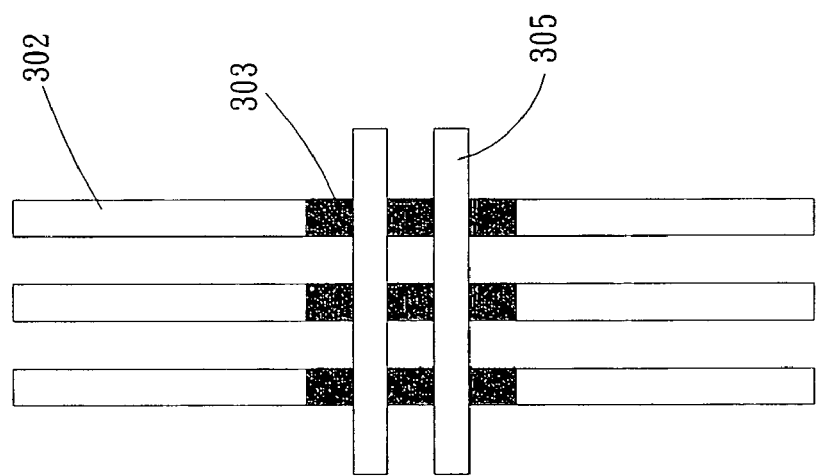
FIG. 5B is a plan schematic view showing a carbon nano-tube field emission display (CNT-FED) having strip shaped gates according to a second embodiment of the present invention.

FIG. 5A is a plan schematic view of the FIG. 4A leaving out the anode plate. The function of the parallel strip shaped gate electrodes 305 is attracting the electrons of the surface of the carbon nano-tube emitters 303 at one side of the cathode electrode 302, wherein the two gate lines at the outside position of the gate electrodes 305 can be a gate or be a control electrode 308 with focus function. In a second embodiment of the present invention (FIG. 5B), it is possible to use only two parallel strip shaped gate electrodes 305 to attract the electrons of the surface of the carbon nano-tube emitters 303 at two sides of the cathode electrode 302 simultaneously. According to the present invention, using the strip shaped gate and the electric force from the side of the gate can confine the diffusion direction of the electron beam in the same direction.

Although preferred embodiments of the present invention, the carbon nano-tube field emission display having strip shaped gates, have been described in detail herein above, it should be clearly understood that many variations and/or modifications of the basic inventive concepts herein taught which may appear to those skilled in the present art will still fall within the spirit and scope of the present invention, as defined in the appended claims.

What is claimed is:

1. A field emission display comprising:
   a cathode plate having a substrate and a plurality of cathode electrodes formed in parallel on said substrate;
   a plurality of electron emitters formed on said plurality of cathode electrodes;
   a plurality of dielectric strips formed substantially perpendicularly to said plurality of cathode electrodes on said substrate, and said plurality of electron emitters;
   a plurality of gate electrodes formed on said plurality of dielectric strips; and
   an anode plate above said plurality of gate electrodes at a distance, said anode plate having a plurality of light emitting strips formed at a bottom surface;
   wherein a rectangular shaped recessed area is formed above said substrate on each side of every electron emitter between two adjacent gate electrodes.

2. The field emission display according to claim 1, wherein said plurality of electron emitters are made of carbon nano-tubes.

* * * * *